J. W. HAZEN.
Road Engine.

No. 113,767.　　　　　　　　　　　Patented Apr. 18, 1871.

Witnesses　　　　　　　　　　　Inventor:
A. Bennechendorf　　　　　　　J. W. Hazen.
Wm. H. C. Smith.
　　　　　　　　　　　　　　　per
　　　　　　　　　　　　　　　　Attorneys.

UNITED STATES PATENT OFFICE.

JOHN W. HAZEN, OF WEST HARTFORD, VERMONT.

IMPROVEMENT IN TRACTION-ENGINES.

Specification forming part of Letters Patent No. 113,767, dated April 18, 1871.

*To all whom it may concern:*

Be it known that I, JOHN W. HAZEN, of West Hartford, in the county of Windsor and State of Vermont, have invented a new and useful Improvement in Traction-Engine; and I do hereby declare that the following is a full, clear, and exact description thereof, which will enable others skilled in the art to make and use the same, reference being had to the accompanying drawing, forming part of this specification, in which—

Figure 1:
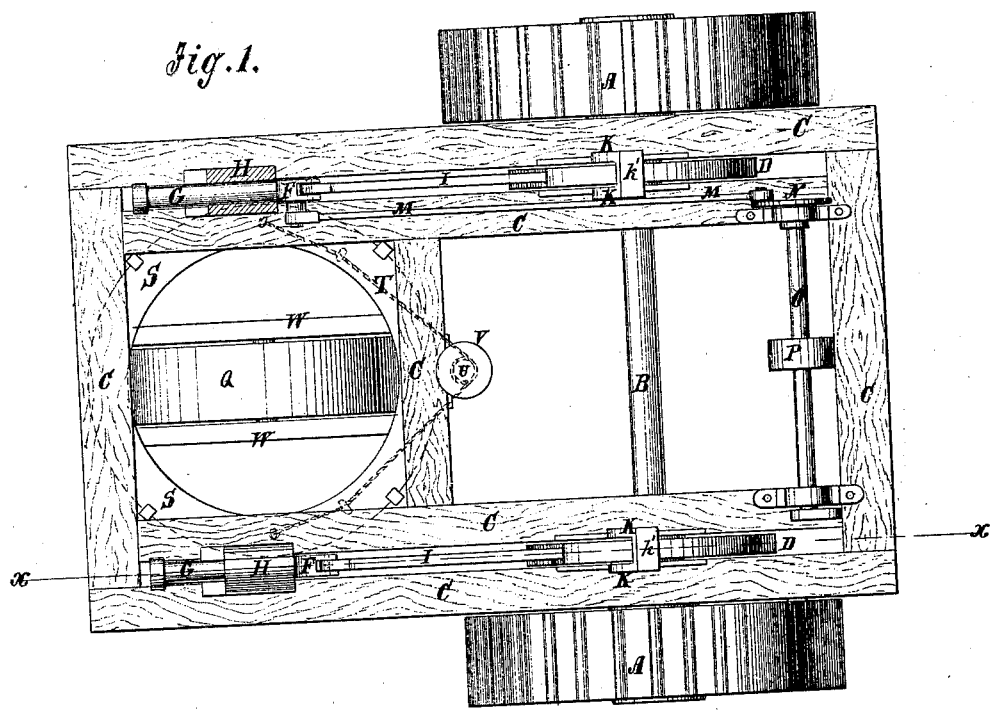
Figure 2:
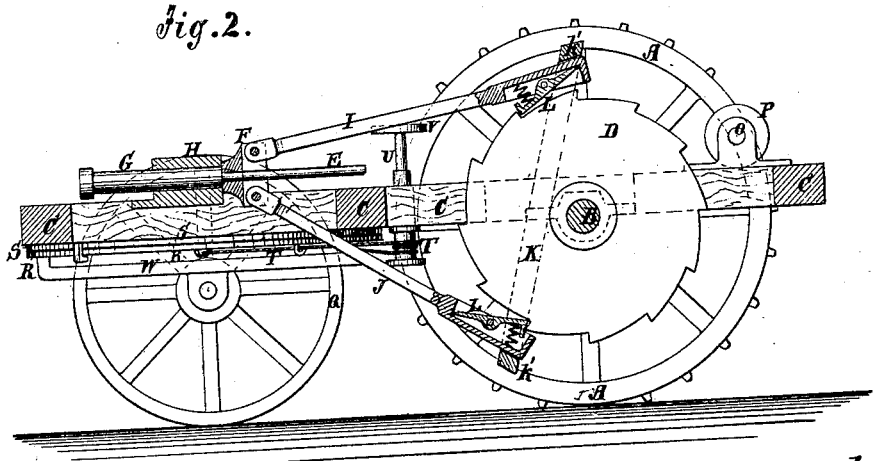

Figure 1 is a top view of the working parts of my improved engine. Fig. 2 is a detail sectional view of the same, taken through the line $x\ x$, Fig. 1.

Similar letters of reference indicate corresponding parts.

My invention has for its object to furnish an improved traction-engine for drawing plows and for other uses, and which shall be simple in construction and effective in operation; and it consists in the construction and combination of various parts of the machine, as hereinafter more fully described.

A are the drive-wheels, the faces of which should be corrugated, and which work upon the journals of the axle B, with which axle they should be connected by clutches, so that they may be made to revolve by the revolution of the said axle when desired. The clutches are not shown in the drawing.

The axle B revolves in bearings attached to the frame-work C. Upon the axle B, between the two side beams of the frame C, are placed the pulleys or ratchet-wheels D, which are keyed or otherwise securely attached to said shaft or axle B.

To the frame C, directly in front of the pulleys or wheels D, are placed the steam-cylinders, which are not shown in the drawing, and to the ends of the piston-rods E of which are attached heads F, to which are attached the guide-rods G, which work in guides H, attached to the frame C.

To the upper and lower ends of the heads F are pivoted the forward ends of the upper levers, I, and of the lower levers, J.

The levers I J pass back above and below the pulleys or wheels D, and are kept in place upon said wheels or pulleys D by the stays or bars K, attached to the side timbers of the frame C upon each side of each of the pulleys D, the ends of each pair of stays K being connected by a block, $k'$, said blocks being so placed as to keep the ends of the levers I J in proper position.

The under side of the rear ends of the upper levers, I, and the upper side of the rear ends of the lower levers, J, are slotted to receive the pawls L, which are pivoted in said slot, and the engaging ends of which are held out by springs, so that the pawls may yield to pass over the teeth when the levers are moving in one direction, and may be projected to take hold of the said teeth and revolve the wheels or pulleys D when the levers are moving in the other direction.

As arranged in the drawing, the upper levers work as they move forward and the lower levers as they move rearward.

The levers I J may be arranged to operate upon the pulleys or wheels D in different ways—as, for instance, they may be arranged with pawls, pins, or cams, to operate in slots or grooves in the sides of said wheels or pulleys, near their rims.

To the side of one or both of the heads F is pivoted the forward end of a connecting-rod, M, the rear end of which is pivoted to a crank or crank-wheel, N, attached to the end of the shaft O, which revolves in bearings attached to the rear part of the frame C.

To the shaft O is attached a pulley or pulleys, P, to receive a band or chain for communicating power to the object or machinery to be moved.

The device M N O P is designed to be used for raising the plows, or for driving, sawing, churning, thrashing, and other machines.

The forward end of the engine is supported by the steering-wheel Q, the journals of which revolve in bearings in bars W, the ends of which are attached to a ring-plate, R, which works in guides upon a ring-plate, S, attached to the forward part of the frame C.

To the ring-plate R, upon the opposite sides of the wheel Q, are attached the ends of the chains or ropes T, which pass over guide-hooks attached to the said plate R, and the other ends of which are wound in opposite directions around, and are securely attached to, the vertical shaft U, which revolves in bearings attached to the frame C, and to the upper end of which is attached a hand-wheel, V, so that by turning the shaft U the wheel Q may be inclined in one or the other direction to guide the machine as required.

Having thus described my invention, I claim as new and desire to secure by Letters Patent—

1. The combination of the levers I J and pawls L, or equivalent, with the heads F, guide-rods G, piston-rods E, and wheels or pulleys D, attached to the shaft, B, to be driven, substantially as herein shown and described, and for the purpose set forth.

2. The combination of the pulley or pulleys P, shaft O, crank N, and connecting-rod M with the head F, guide-rod G, piston-rod E, levers I J, wheels or pulleys D, and shaft B, substantially as herein shown and described, and for the purpose set forth.

JOHN W. HAZEN.

Witnesses:
A. G. SNOW,
VOLNEY THURSTON.